United States Patent Office 2,814,096
Patented Nov. 26, 1957

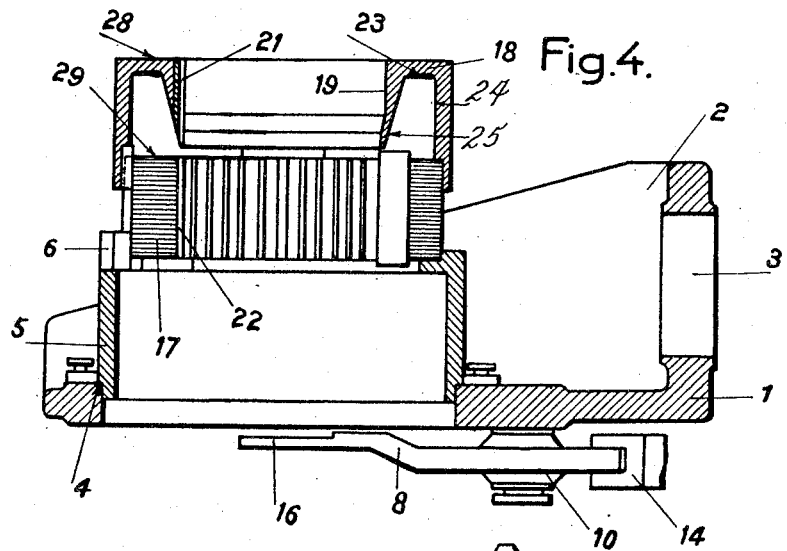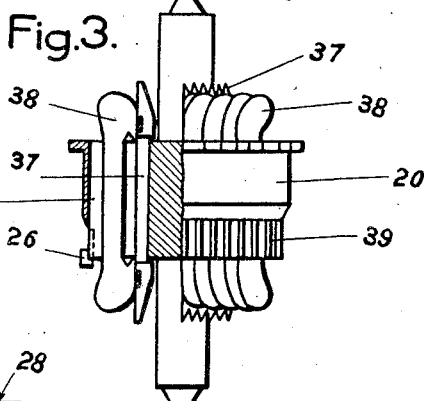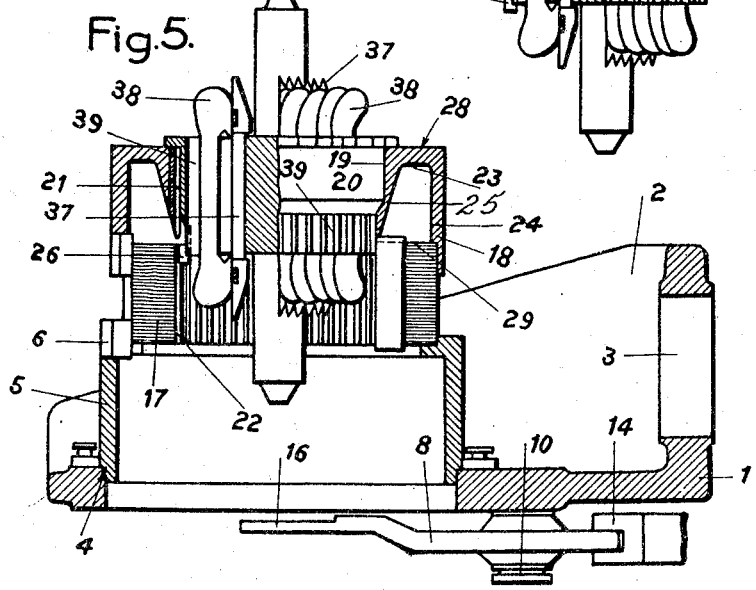

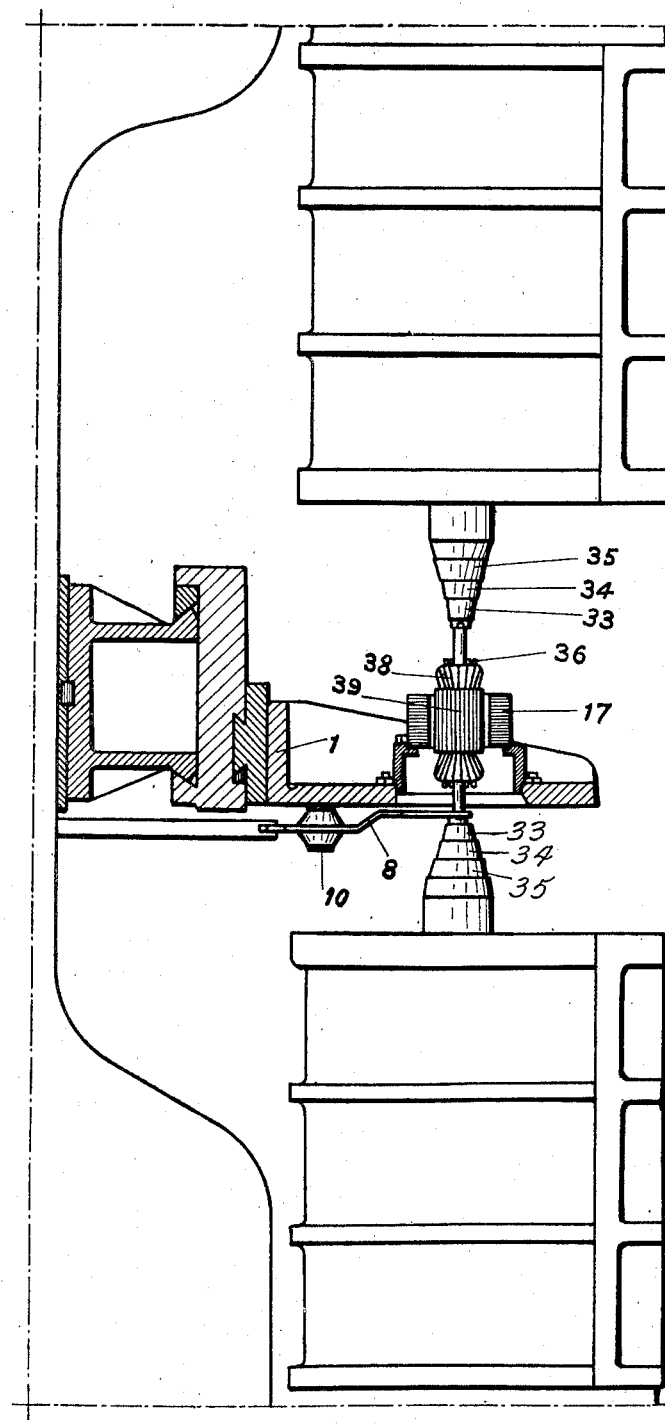

2,814,096

DEVICE FOR POSITIONING STATORS AND DUMMY ROTORS IN MACHINES FOR INSERTING COILS IN THE SLOTS OF STATORS

René Herbrecht, Paris, France, assignor to Societe Anonyme dite: Compagnie Electro-Mecanique, Paris, France Application July 10, 1953, Serial No. 367,311

Claims priority, application France December 2, 1952

6 Claims. (Cl. 29—205)

The transfer of coils in the slots of stators of electrical machines through mechanical or automatical means, as resulting from the arrangements disclosed in the U. S. Patent No. 2,506,173 filed on November 4, 1948, has led to research as to the best means of reducing the time required for loading and unloading the machine so that these specific steps may occur more or less automatically.

A loading operation consists essentially:

In fastening the stator so that it be properly positioned as the coils are transferred from the dummy rotor to the stator;

In introducing the wound dummy rotor into the empty or half-empty stator (if the operation takes place in two separate steps);

In maintaining the dummy rotor within the stator until it is properly locked in position by the central shafts of the inserting heads.

Now, it is the essential object of this invention to provide a device whereby this operation can be carried out in a reduced time and without any manual handling by the operator of the coil inserting machine.

The device according to the present invention comprises a plurality of interfitting parts the combination of which makes it possible to carry out perfectly and completely the operative steps mentioned hereabove on a coil-inserting machine having a vertical axis. The device comprises three of these interfitting parts, viz.:

(a) a bracket for centering the stator and fastening the device assembly on a movable bed provided on the coil inserting machine;

(b) a guide ring for introducing the dummy rotor into the stator;

(c) a spring clip for holding the dummy rotor before it is locked by the central shaft of the inserting heads.

The following description will afford a clearer understanding of the invention and the manner in which the same can be carried out in the practice, if reference is made to the attached drawings forming part of this specification and illustrating diagrammatically by way of example one form of embodiment of the invention. In the drawings:

Figure 3 illustrates a dummy rotor with its coils;

Figure 4 is an axial sectional view showing the device before the dummy rotor is positioned;

Figure 5 is a similar view showing the device after the dummy rotor has been positioned in the guide ring;

Figure 8 is a complete view of the device.

Figure 1:
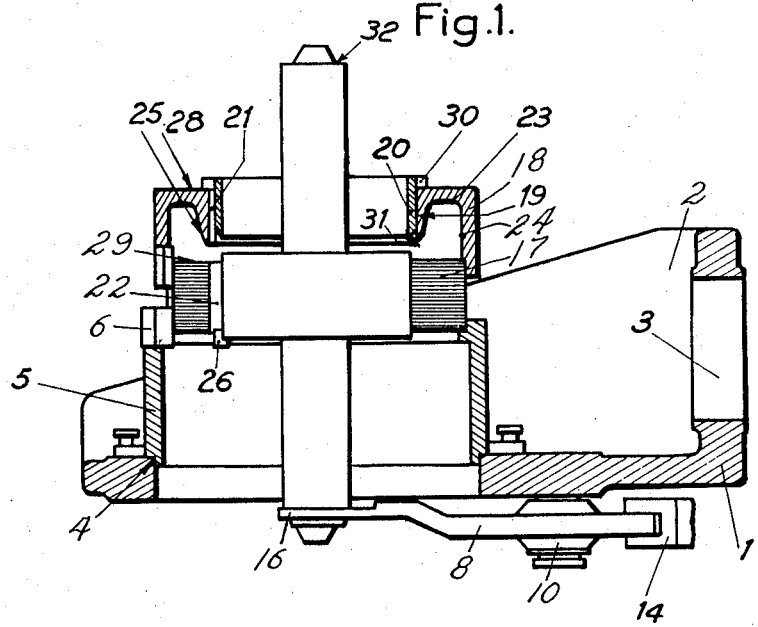
Figure 1 is an axial cross sectional view of the device.

The first element (a) of the above list of components is a bracket 1 having the general shape of a corner plate reinforced by stiffening webs 2; this bracket is adapted to be mounted on the sliding portion of a movable bed provided on the framework of the coil inserting machine. This mounting is facilitated by the provision of slots 3 which make it possible to so adjust the parts that the transverse symmetrical plane of the stator core will register exactly with the transverse symmetrical plane of the inserting heads. Moreover, this bracket 1 is formed with a centering annular edge 4 on which the case of the stator in which the coils are to be inserted is centered either directly if the stator is provided with an outer case, or through the medium of an intermediary element 5 carrying one or more positioning studs 6 so that the stator will constantly have the same angular relationship with the machine. The intermediary element 5 may also serve, in case of need, to position on this bracket a stator the centering diameter of which is smaller than the centering diameter of the bracket, whether the stator is provided or not with a case.

Figure 2:
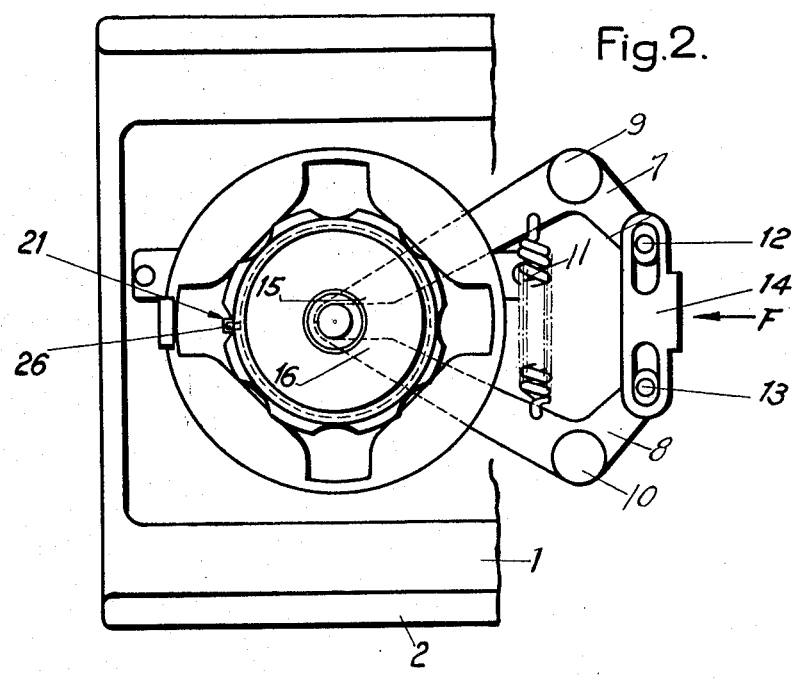
Figure 2 is a plan view from beneath of the device, showing more particularly the spring clip holder.

On the lower horizontal face of the angle bracket there is mounted a clip holder for maintaining the dummy rotor in its proper position before it is locked by the central shafts of the inserting heads. This holder (see Fig. 2) consists of a pair of prongs 15, 16 forming a clip, the arms of which are pivotally mounted on fixed vertical pins 9, 10 and provided with extensions 7, 8; these prongs are constantly urged towards each other by a return spring 11 and may be moved away from each other by applying a force in the direction of the arrow F on the outer ends 12, 13 of the extensions 7, 8 through a slotted follower 14, so as to divaricate the prongs 15, 16 until the space freed thereby corresponds to a cylinder of same diameter as that of the annular centering edge 4. Any suitable device or means may be used for pushing the member 14 as it forms no part of the bracket but of the winding machine on which the bracket is mounted.

The clip prongs 15, 16 are machined in view of supporting in proper relationship the bearing collars 32 of the dummy rotor spindles. The vertical position of the supporting plane of the prongs is so calculated, that according to the length of the dummy rotor spindle to be supported thereby the transverse symmetrical plane of the dummy rotor merges with the transverse symmetrical plane of the stator.

As long as the central shafts of the inserting heads do not exert their locking action on the dummy rotor, the latter is supported by the clip. When the dummy rotor is locked by these shafts, an action on the member 14 in the direction of the arrow F causes the inner ends of the prongs 15, 16 to divaricate, thereby clearing completely the field of action of the telescopic tubular members. When the action of these members is completed and the members themselves have been retracted, the coil inserting machine resumes its original position, the clip prongs 15, 16 are moved towards each other and support again the dummy rotor, so that the latter can be unlocked from the central shafts without any risk of falling.

Figure 7:
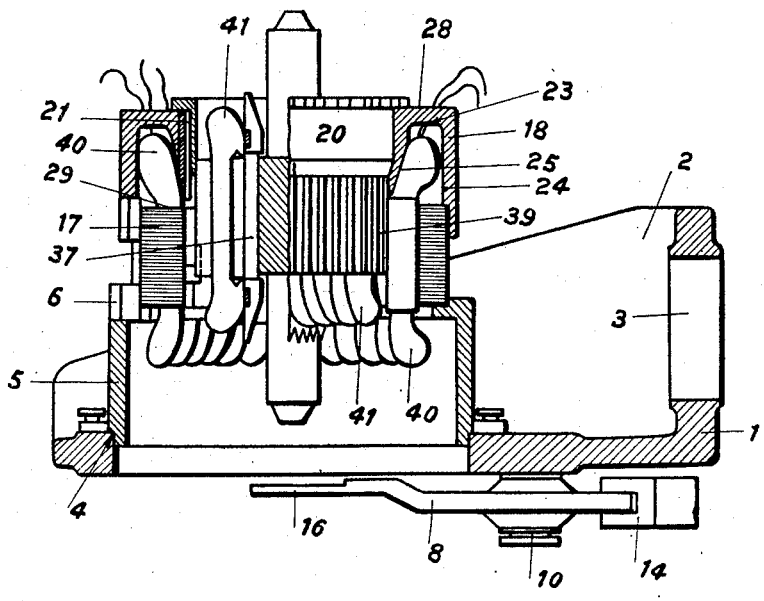
Figure 7 is a similar view showing the dummy rotor in an intermediate position when the coils have been disposed in two layers, a first layer being already positioned on the stator and the other on the dummy rotor.

In the device described hereinabove, the dummy rotor is introduced as follows:

With the stator 17 previously centered on the bracket through its lower face, or its upper face by using the constructional features of each specific stator (case centering outer diameter of the sheet metal, etc.), the radial position is secured through other constructional features (for instance an adaptor for connecting wires, sheet stacking positioning notches, etc.) by means of a guide ring 18. The inner diameter 19 of this guide ring 18 as illustrated in Fig. 4 corresponds to the outer diameter of a holding member 20 fitting on the dummy rotor for maintaining its winding so that said member may be introduced in said guide ring 18 (Figure 3) with its push members 37 and coils 38 in each of its slots 39 slide in smooth frictional engagement in its cylindrical wall 19 till the shoulder 30 of said member rests on the bearing face 28 of said guide ring 18. This cylindrical wall 19 is formed with a longitudinal notch 21, in line with a longitudinal notch 22 cut in the stator plate stacking for maintaining in axial alignment the dummy rotor in the stator during the transfer of the coils from the former to the latter. Finally, the peripheral surface of the guide ring 18, as defined by the walls 25, 23 and 24, is such that the volume formed thereby is sufficient to accommodate the coil heads of the partly wound stator (Figure 7) in case the coils are to be disposed in two layers, the coils 40 of the first layer being already introduced in the slots of the stator 17, whilst the coils 41 of the second layer are still held in the dummy rotor by the holding member 20. For this purpose the wall 25 of this ring is tapered so that on positioning the guide ring 18 on the stator these coil heads will be slightly spread in order to protect same and enable the dummy rotor to be introduced into the very half-wound stator without any extreme cares and however without any risk of deteriorating neither the coils carried by the dummy rotor nor that already threaded on the stator.

Figure 6:
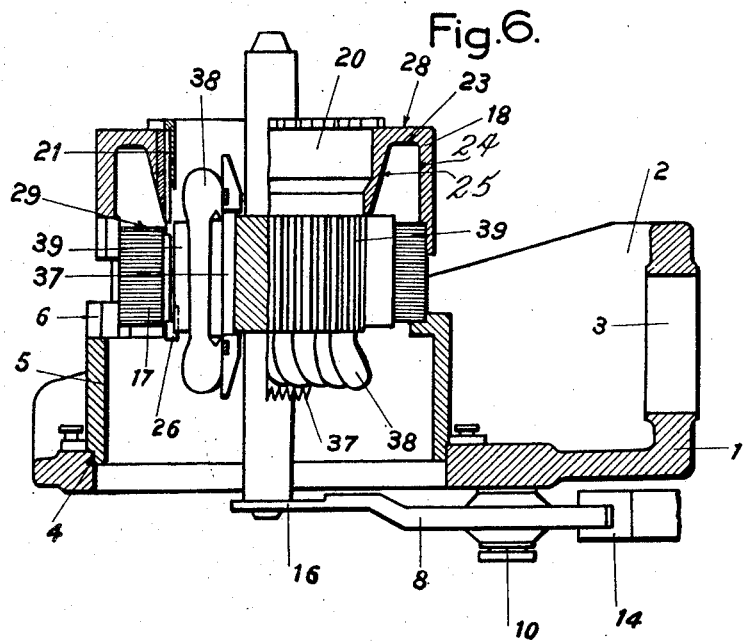
Figure 6 is a similar view showing the relative positions of the parts upon completion of the sliding movement of the dummy rotor resting on the spring clip.

The operation of the device will be readily understood from the foregoing. It will be sufficient to present the dummy rotor in vertical alignment relative to the guide ring 18 so that the positioning tag 26 of the dummy rotor will penetrate the notch 21 of the guide ring. The dummy rotor and the member 20 provided for maintaining its coils are lowered vertically and at the end of this movement the shoulder 30 of this holding member 20 engages the bearing face 28 of the guide ring as shown in Figure 5. The distance from the lower edge 31 of the guide ring 18 to the upper face 29 of the stator is so calculated that at this time the dummy rotor will be positioned in close proximity of the stator (for instance 1/64" or so). The dummy rotor is further lowered and its positioning tag engages the notch 22 of the stator. Therefore, the dummy rotor is constantly guided during its vertical downward travel, and no difficult positioning step is involved. On the other hand, the dummy rotor coils are maintained by the holding member 20 provided for this purpose, until the coils are very close to the stator core, and positioned in vertical alignment with the stator notches to be engaged. At the end of its travel the dummy rotor is stopped by the clip holder 15, 16 which maintains it in its proper position as shown in Fig. 6. Then, it will be sufficient merely to remove the guide ring 18 still carrying the holding member 20, so that the machine described more in detail in the co-pending U. S. patent application Ser. No. 367,276 may cause, through the axial sliding movement of the telescopic tubular members 33, 34, 35, the radial outward movement of the push members 36 of the dummy rotor and may thus be able to transfer through radial thrust the coils disposed beforehand in the slots of the dummy rotor to the slots of the stator.

Although the above description refers to only one form of embodiment of the invention, it will be readily apparent for anybody conversant with the art that many modifications and alterations may be brought thereto without departing from the spirit and scope of the invention as disclosed in the appended claims.

What I claim is:

1. An arrangement for positioning stators and dummy rotors in a coil inserting machine adapted to transfer in the slots of the stator, through radial thrust, the coils disposed beforehand in the slots of the dummy rotor, comprising a bracket adapted to be mounted on the coil inserting machine, a device for centering the stator on said bracket, means for securing said bracket to said machine whereby the axis and the transverse symmetrical plane of the stator core will merge with the axis and the transverse symmetrical plane of said machine, a guide ring adapted to be carried and centered by the said stator for introducing the dummy rotor into said stator, and a holding clip on said bracket having prongs normally spring urged to a position in which they hold the dummy rotor spindle before said spindle is locked in position by the machine.

2. An arrangement according to claim 1, wherein an intermediary member is provided between said stator centering device and said stator.

3. An arrangement according to claim 1 wherein the inner bore of said guide ring is formed with a notch adapted to be positioned in precise axial alignment with a notch formed in the stator plate stacking when said stator is supported by the centering device of said angle bracket.

4. An arrangement according to claim 1, wherein said guide ring is formed with a recess for receiving the coil heads of the coils in a partially filled stator, one wall of said recess having a tapered profile.

5. An arrangement according to claim 1, wherein said clip holder comprises a pair of prongs and a spring urging said prongs towards each other.

6. An arrangement according to claim 1, wherein said clip holder comprises a pair of prongs pivotally mounted on vertical pins, a spring constantly urging said prongs towards each other, extension arms beyond said pivot pins, end pins at the outer extremities of said extension arms, and a follower formed with at least one slot slidably engaged by said end pins.

References Cited in the file of this patent

UNITED STATES PATENTS

| | | |
|---|---|---|
| 1,575,132 | Shirley | Mar. 2, 1926 |
| 2,008,268 | Whitfield | July 16, 1935 |
| 2,506,173 | Polard | May 2, 1950 |